United States Patent
Dhawan et al.

(10) Patent No.: US 12,271,371 B1
(45) Date of Patent: Apr. 8, 2025

(54) REAL TIME PROCESSING WITH DATA AGGREGATION AND VALIDATION

(71) Applicant: DoorDash, Inc., San Francisco, CA (US)

(72) Inventors: Nishant Dhawan, Alameda, CA (US); Nikhil Jindal, Newark, CA (US); Joanna Smulska, San Francisco, CA (US); Surajit Dutta, Fremont, CA (US); Sudharshan Muralidharan, Newark, CA (US); Nikita Balakrishnan, Mountain View, CA (US)

(73) Assignee: DoorDash, Inc., San Francisco, CA (US)

( * ) Notice: Subject to any disclaimer, the term of this patent is extended or adjusted under 35 U.S.C. 154(b) by 0 days.

(21) Appl. No.: 18/409,306

(22) Filed: Jan. 10, 2024

Related U.S. Application Data

(60) Provisional application No. 63/480,902, filed on Jan. 20, 2023.

(51) Int. Cl.
 *G06F 16/00* (2019.01)
 *G06F 16/23* (2019.01)
 *G06F 16/2455* (2019.01)

(52) U.S. Cl.
 CPC .... *G06F 16/2379* (2019.01); *G06F 16/24568* (2019.01)

(58) Field of Classification Search
 CPC ......... G06F 16/24542; G06F 16/24568; G06F 3/0482; G06F 16/9577; H04L 41/40; H04L 12/1403; H04L 12/1432; H04L 63/123; H04L 63/083; H04M 1/724; H04M 1/72445; H04M 15/41; H04M 15/43; H04M 15/51; H04M 15/52; H04M 15/58; H04M 15/70; H04M 2201/60; H04M 2203/1058; H04M 2203/2016; H04M 3/4938;
(Continued)

(56) References Cited

U.S. PATENT DOCUMENTS

| 6,384,850 B1 | 5/2002 | McNally et al. |
| 6,871,325 B1 | 3/2005 | McNally et al. |
| 6,982,733 B1 | 1/2006 | McNally et al. |

(Continued)

FOREIGN PATENT DOCUMENTS

WO    0122289 A1    3/2001

OTHER PUBLICATIONS

"Civil Action No. 2:23-CV-2165-WSH", Amended Complaint for Patent Infringement—*Ameranth, Inc.*, Plaintiff, V. *Doordash, Inc., Eat'n Park Restaurants, LLC, and Eat'n Park Hospitality Group, Inc.*, Defendants, Sep. 17, 2024, pp. 1-91.

(Continued)

*Primary Examiner* — Shyue Jiunn Hwa
(74) *Attorney, Agent, or Firm* — Kilpatrick Townsend & Stockton LLP

(57) ABSTRACT

A central server computer can process the data in real time by using an event-based data (i.e., event data) platform. Event-based data can be actions performed by entities providing the data to the central server computer. Storing the event-based data can allow the central server computer to store a transaction data in a granular manner according to different events, which can help with verification and traceability.

20 Claims, 10 Drawing Sheets

(58) Field of Classification Search
CPC ............... G06Q 10/02; G06Q 30/0621; G06Q 30/0623; G06Q 30/0641
See application file for complete search history.

(56) References Cited

U.S. PATENT DOCUMENTS

| | | | |
|---|---|---|---|
| 8,146,077 B2 | 3/2012 | McNally et al. | |
| 9,009,060 B2 | 4/2015 | McNally | |
| 9,747,651 B2 | 8/2017 | McNally | |
| 10,970,797 B2 | 4/2021 | McNally | |
| 11,276,130 B2 | 3/2022 | McNally | |
| 11,842,415 B2 | 12/2023 | McNally | |
| 11,847,587 B1 | 12/2023 | McNally | |
| 2002/0169644 A1* | 11/2002 | Greene | H04L 63/08 705/7.18 |
| 2005/0227625 A1* | 10/2005 | Diener | H04B 17/23 455/67.11 |
| 2009/0024622 A1* | 1/2009 | Chkodrov | G06F 16/24568 |
| 2012/0202449 A1* | 8/2012 | Meyer | H04L 12/1442 455/414.1 |
| 2013/0080348 A1* | 3/2013 | Pantaliano | G06Q 30/02 705/347 |
| 2013/0336235 A1* | 12/2013 | Meyer | H04M 15/58 370/329 |
| 2014/0249937 A1 | 9/2014 | McNally | |
| 2020/0273268 A1* | 8/2020 | Bhattacharyya | G06Q 10/06315 |

OTHER PUBLICATIONS

U.S. Appl. No. 18/145,942, "Unpublished U.S. Patent Application No.", Dec. 23, 2022.

* cited by examiner

Sample Event - order_submit (JSON)

{"order_submit": ~~~~~~~~~~~~~
~~~~~~~~~~~~~~~~~~~~~~~~~~~~~
"subtotal_amount": {"sign": true, "currency": "USD", "unt_amount": 1649, ~~~~~~
~~~~~~~~~~~~~~~~~~~~~~~~~~~~~

FIG. 8A

| ROW | EVENT_ID | NAME | ENTITY_TYPE | ENTITY_ID | PUBLISH_TIME |
|---|---|---|---|---|---|
| 1 | AAA-0001 | Card_payment_created | Order_cart | 1234 | 12/13/22 1:31:58.1 |
| 2 | AAA-0009 | Create | Delivery | 1255 | 12/13/22 1:31:58.0 |
| 3 | AAA-0010 | Order_Submitted | Order_cart | 1234 | 12/13/22 1:31:58.9 |
| 4 | AAA-0012 | Order_confirmation | Order_cart | 1234 | 12/13/22 1:32:18.1 |
| 5 | AAA-0015 | Select | Order_cart | 1234 | 12/13/22 1:34:07.0 |
| 6 | AAA-0100 | Transporter_delivery_pay | Delivery | 1255 | 12/13/22 1:34:08.0 |
| 7 | AAA-0812 | Unselect | Delivery | 1255 | 12/13/22 1:34:21.0 |
| 8 | AAA-4211 | Select | Delivery | 1255 | 12/13/22 1:34:28.0 |
| 9 | AAA-5122 | Transporter_delivery_pay | Delivery | 1255 | 12/13/22 1:34:29.0 |
| 10 | AAA-5444 | Unselect | Delivery | 1255 | 12/13/22 1:34:38.0 |
| 11 | AAA-5454 | Select | Delivery | 1255 | 12/13/22 1:34:48.0 |
| 12 | AAA-5494 | Transporter_delivery_pay | Delivery | 1255 | 12/13/22 1:34:49.0 |
| 13 | AAA-5644 | Pickup | Delivery | 1255 | 12/13/22 1:37:26.0 |
| 14 | AAA-5844 | Order_commission | Store_order_cart | 1266 | 12/13/22 1:37:27.425 |
| 15 | AAA-5944 | Order_payout | Store_order_cart | 1266 | 12/13/22 1:37:27.49 |

FIG. 8B

| ROW | COA_ID | ACCOUNT_DESCRIPTION | CREDITED | DEBITED | CURRENCY | CREATED_AT | BOOKING_TIME |
|---|---|---|---|---|---|---|---|
| 1 | 4100 | Commission | 330 | 0 | USD | 12/13/22 1:37:27 | 12/13/22 1:37:18 |
| 2 | 2201 | Merchant_Payable | 0 | 330 | USD | 12/13/22 1:37:27 | 12/13/22 1:37:18 |
| 3 | 2200 | Driver_Payable | 400 | 0 | USD | 12/13/22 1:37:27 | 12/13/22 1:37:26 |
| 4 | 4630 | Pass-Through_Payments: Tips | 0 | 400 | USD | 12/13/22 1:37:27 | 12/13/22 1:37:26 |
| 5 | 2200 | Transporter_Payable | 300 | 0 | USD | 12/13/22 1:37:27 | 12/13/22 1:37:26 |
| 6 | 5010 | Transporter_Base Pay | 0 | 300 | USD | 12/13/22 1:37:27 | 12/13/22 1:37:26 |
| 7 | 2201 | Merchant_Payable | 150 | 0 | USD | 12/13/22 1:32:18 | 12/13/22 1:32:18 |
| 8 | 4620 | Pass-Through_Payments: Tax | 0 | 150 | USD | 12/13/22 1:32:18 | 12/13/22 1:32:18 |
| 9 | 2201 | Merchant_Payable | 2000 | 0 | USD | 12/13/22 1:32:18 | 12/13/22 1:32:18 |
| 10 | 4610 | Pass_through_Payments: Subtotal | 0 | 2000 | USD | 12/13/22 1:32:18 | 12/13/22 1:32:18 |

FIG. 8C

REAL TIME PROCESSING WITH DATA AGGREGATION AND VALIDATION

CROSS-REFERENCE TO RELATED APPLICATIONS

This application is a non-provisional application and claims priority to and the benefit of the filing date of U.S. Provisional Application No. 63/480,902, filed on Jan. 20, 2023, which is herein incorporated by reference in its entirety.

SUMMARY

One embodiment includes a method. The method comprises receiving, by a central computer comprising a processor, a non-transitory computer readable medium comprising a real-time event streaming module, an aggregator module, and a workflow module comprising an event validator and one or more aggregation processors, and an events database, a plurality of event data packets associated with a plurality of transactions from a plurality of service provider computers, a plurality of user devices, and a logistics platform; providing, by the real-time event streaming module to the aggregator module, the event data packets in real-time; aggregating, by the aggregator module, the event data packets according to their corresponding transactions to form a plurality of event data packet groups; and for each event data packet group in the plurality of event data packet groups: validating, by the event validator, the event data in event data packets in the event data packet group, after validating the event data in the event data packets in the event data packet group, storing the event data packets in the event data packets in the event data packet group in the events database, and processing, by the one or more aggregation processors, stored the event data in the event data packets in the event data packet group.

Another embodiment includes a central server computer comprising: a processor; an events database; and a non-transitory computer readable medium, the non-transitory computer readable medium comprising a real-time event streaming module, an aggregator module, and a workflow module comprising an event validator and one or more aggregation processors, wherein the real-time event streaming module comprises code for receiving a plurality of event data packets associated with a plurality of transactions from a plurality of service provider computers, a plurality of user devices, and a logistics platform; the aggregator module comprises code for receiving the event data packets in real-time from the real-time event streaming module and aggregating the event data packets according to their corresponding transactions to form a plurality of event data packet groups, and for each event data packet group in the plurality of event data packet groups: validating, by the event validator, the event data in event data packets in the event data packet group, after validating the event data in the event data packets in the event data packet group, storing the event data packets in the event data packets in the event data packet group in the events database, and processing, by the one or more aggregation processors, stored the event data in the event data packets in the event data packet group.

Another embodiment includes a system comprising: a central server computer comprising a processor, an events database, and a non-transitory computer readable medium, the non-transitory computer readable medium comprising a real-time event streaming module, an aggregator module, and a workflow module comprising an event validator and one or more aggregation processors, wherein the real-time event streaming module comprises code for receiving a plurality of event data packets associated with a plurality of transactions from a plurality of service provider computers, a plurality of user devices, and a logistics platform, the aggregator module comprises code for receiving the event data packets in real-time from the real-time event streaming module and aggregating the event data packets according to their corresponding transactions to form a plurality of event data packet groups, and for each event data packet group in the plurality of event data packet groups: validating, by the event validator, the event data in event data packets in the event data packet group, after validating the event data in the event data packets in the event data packet group, storing the event data packets in the event data packets in the event data packet group in the events database, and processing, by the one or more aggregation processors, stored the event data in the event data packets in the event data packet group; and the logistics platform.

These and other embodiments are described in further detail below with reference to the following detailed description and accompanying drawings.

BRIEF DESCRIPTION OF THE DRAWINGS11

FIG. 8A shows a sample event such as "order submit" in a JSON data format.

FIG. 8B shows an event data group data packet with event data from event data packets. Each row can indicate a single event data packet.

FIG. 8C shows a table with processed event data.

DETAILED DESCRIPTION

Figure 1:
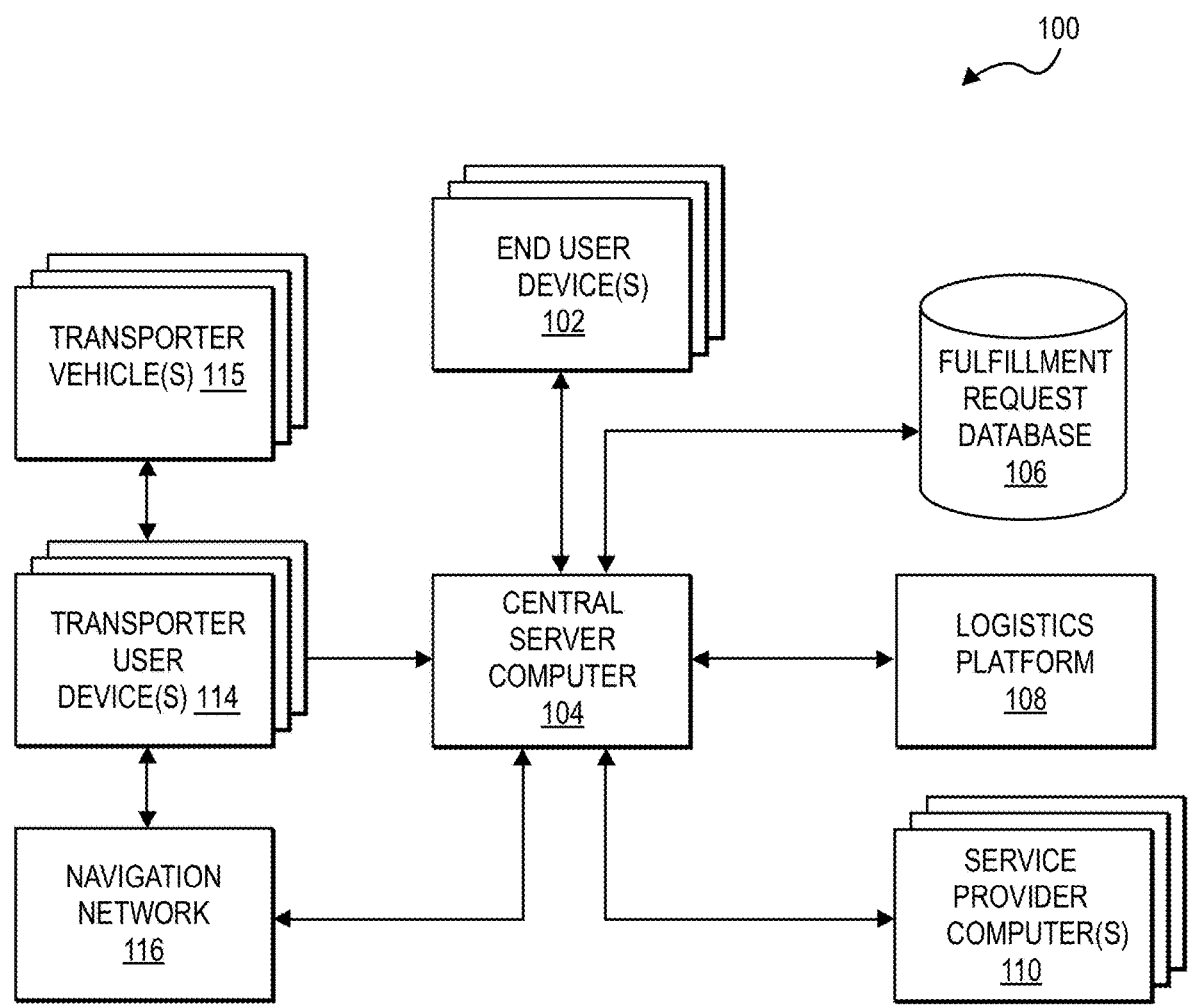
FIG. 1 shows a block diagram of a system according to embodiments.

Prior to discussing embodiments of the disclosure, some terms can be described in further detail.

An "item" can be an individual article or unit. Examples of items can include perishable items such as food items, beauty items (e.g., cosmetics), office supply products (e.g., staples, paper, and ink), hardware items (e.g., nails, hammers, wrenches), electronic devices (e.g., computers, phones, etc.), jewelry, etc.

A "user" may include an individual or an entity. In some embodiments, a user may be associated with one or more personal accounts and/or mobile devices. In some embodiments, the user may be a consumer.

A "user device" may be any suitable electronic device that can be used by a user. An exemplary user device can process and communicate information to other electronic devices. The user device may include a processor and a computer readable medium coupled to the processor, the computer readable medium comprising code, executable by the processor. The user device may also each include an external communication interface for communicating with other entities. Examples of user devices may include mobile devices such as mobile phones and laptop computers, wearable devices (e.g., glasses, rings, watches, etc.), hardware modules in larger devices such as vehicles (e.g., automobiles), etc.

A "server computer" can be a powerful computer or cluster of computers. For example, the central server computer can be a large mainframe, a minicomputer cluster, or a group of servers functioning as a unit. In one example, the central server computer may be a database server coupled to a Web server. The central server computer may also be a cloud based server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "fulfillment request" can be a request to provide one or more items. For example, a fulfillment request can include an initial communication from an end user device to a central server computer for a service provider computer to fulfill a purchase request for an item such as food.

A "transporter" can be an entity that transports something. For example, a transporter can be a person that transports an item using a transporter vehicle (e.g., a car). In other embodiments, a transporter can be a transporter vehicle that may or may not be operated by a human. Examples of transporter vehicles include cars, boats, scooters, bicycles, drones, airplanes, etc.

When an entity receives data to process, the entity typically stores the data in a database and does not start processing the data for a period of time until there is a need to process the data. For example, when a data processor receives transaction data from multiple users, the data processor may not start processing or organizing the transaction data until it needs to do so (e.g., filing a tax report, analyzing to find customer behavior, etc.).

However, there are problems with conventional data processing approaches. One problem is that during the period of time in which the data is stored in the database, there remains a risk of mutability (e.g., data being modified) due to different causes such as a change in underlying database. Another problem is that it is difficult for the data processor to process and/or organize a large amount of data collected over the period of time at once, especially when the data stored in the database is complex and/or involves many different parties. In some cases, data associated with millions of events can be received by a server computer and stored in a database. This data can take a significant amount of time to sort through to obtain meaningful insights or to take specific actions. Yet another problem is that the entity does not have any insights or information into the data stored in the database until the entity decides to process and/or organize the data stored in the database. A more efficient and faster way is needed to ensure that processed data is immutable, traceable, and auditable.

Embodiments of the disclosure address this problem and other problems individually and collectively.

In embodiments, a central server computer can process event data in event data packets in real time. Event data can include data relating to actions performed by various entities including end users, service providers, logistics platforms, internal computers, etc. In some embodiments, the event data can be data associated with separate events of one or more transactions. For example, a service provider such as a restaurant can provide transaction data associated with a food delivery transaction involving a user the service provider to the central server computer. The food delivery transaction can have multiple events including creating an order, providing the created order to the service provider, creating by the service provider items related to the order, picking up the items in the order by a transporter, and delivering the items in the order to the end user, etc. Data relating to these events can be captured and processed in real time using embodiments. The central server computer can store the event data in a granular manner according to different the events, which can help with verification and traceability.

The central server computer, upon receiving event data in data packets, can process the event data. The central server computer can then store the event data packets in a database such as a third-party cloud database by using an archiver module before processing the data in the data packets. The event data can be stored in the database for different use cases such as reprocessing or re-testing. For example, the event data packets with the event data can be stored in the database and can be used as backup data in case backup data is needed by the central server computer.

In embodiments, the central server computer can then collect and aggregate data packets with event data using an aggregator module. The central server computer can filter the data packets by filtering out the parts of the event-data packets that are unnecessary. For example, when an entity processes event data packets for financial reporting, data such as the addresses of the end users, their names, etc. can be removed. The filtered data packets can then be filtered using other filters such as by the type of data packet (e.g., whether the data packet relates to delivery, order (e.g., a subscription order), payment, etc. The aggregator module can also group data packets according to their corresponding transactions to determine a plurality of event data packet groups. For example, the aggregator module can aggregate event data packets with the same delivery ID (same transaction) to form a delivery event data packet group while a subscription aggregation filter can aggregate event data packets with the same transaction ID to form an event data packet group for a particular transaction.

In embodiments, the central server computer can also use workflow module to validate data packets with event data within an event data packet group in a plurality of event data packet groups. Once validated, the data packets in each event data packet group can be processed in some manner. For example, event data in data packets in an event data packet group can be processed according to specific rules such as accounting rules to determine one or more entries of an accounting journal or accounting record. In some cases, the workflow module can validate the event data packet group by making sure that event data packets of the event data packet group are consistent with each other (e.g., a data packet for an "generate cart" event which has a transaction amount of X, matches a data packet for a "submit order" event, which also has a transaction amount of X). If the central server computer fails to validate the data packets in an event data packet group, then it can be stored in a separate event database (e.g., an errors database) and can stop processing the event data in the data packets in the event data packet group.

The central server computer can also process the event data in the event data packets. In some cases, the central server computer processes the event data in the event data packets to create journal entries from the event data.

FIG. 1 shows a system 100 according to embodiments of the disclosure. The system 100 comprises one or more end user devices 102, a central server computer 104, a fulfillment request database 106, a logistics platform 108, one or more service provider computers 110, one or more transporter user devices 114, and a navigation network 116. One or more transporter vehicles 115 are also shown. A transporter can operate a transporter user device 114 and a transporter vehicle 115. For example, a transporter can be a delivery person, the transporter user device 114 can be the delivery person's mobile phone, and the transporter vehicle 115 can be a car that is operated by the delivery person.

The central server computer 104 can be in operative communication with the one or more end user devices 102, the fulfillment request database 106, the logistics platform 108, the one or more service provider computers 110, the transporter user devices 114, and in some embodiments, the navigation network 116. Further, the one or more transporter user devices 114 can be in operative communication with the navigation network 116.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between at least the devices in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The one or more end user devices 102 include devices operated by end users. The one or more end user devices 102 can generate and provide fulfillment request messages to the central server computer 104. A fulfillment request message be a request for a service or item from one or more service providers operating one or more service provider computers 110. For example, a fulfillment request message can be generated based on a cart selected at checkout during a transaction using a central server computer application installed on the end user device 102. The fulfillment request message can include one or more items from the selected cart and an indication of the service provider that will provide the one or more items.

The central server computer 104 includes a server computer that can facilitate in the fulfillment of fulfillment requests received from the one or more end user devices 102. For example, the central server computer 104 can identify one or more transporters operating one or more transporter user devices 114 that are capable of satisfying the fulfillment request. The central server computer 104 can identify the transporter user device 114 that can satisfy the fulfillment request based on any suitable criteria (e.g., transporter location, service provider location, end user destination, end user location, transporter mode of transportation, etc.). The logistics platform 108 may provide real time data regarding locations of the various service providers, transporters, and end users to the central server computer 104.

The central server computer 104 can comprise: a processor; an events database; and a non-transitory computer readable medium, the non-transitory computer readable medium comprising a real-time event streaming module, an aggregator module, and a workflow module comprising an event validator and one or more aggregation processors, wherein the real-time event streaming module comprises code for receiving a plurality of event data packets associated with a plurality of transactions from a plurality of service provider computers, a plurality of user devices, and a logistics platform; the aggregator module comprises code for receiving the event data packets in real-time from the real-time event streaming module and aggregating the event data packets according to their corresponding transactions to form a plurality of event data packet groups, and for each event data packet group in the plurality of event data packet groups: validating, by the event validator, the event data in event data packets in the event data packet group, after validating the event data in the event data packets in the event data packet group, storing the event data packets in the event data packets in the event data packet group in the events database, and processing, by the aggregation processor module, stored the event data in the event data packets in the event data packet group.

The fulfillment request database 106 can store data related to previous (e.g., historical) fulfillment requests. For example, after a fulfillment request is fulfilled, the central server computer 104 can store fulfillment request data into the fulfillment request database 106. For example, the central server computer 104 can store any spatial-temporal fulfillment data (e.g., transporter user device location over time, transporter user device motion data over time, length of time taken to fulfill the fulfillment request, a fulfillment time, a fulfillment location, etc.), fulfillment service data (e.g., fulfilled services, an amount, a service provider computer identifier, an end user device identifier, a transporter user device identifier, etc.), and any other data relating to the fulfillment request and/or the fulfillment of the fulfillment request.

The one or more service provider computers 110 include computers operated by service providers. For example, a service provider computer can be a food provider computer that is operated by a food provider. The one or more service provider computers 110 can offer to provide services to the end users of the one or more end user devices 102. The service provider computer 110 can receive requests to prepare one or more items for delivery from the central server computer 104. The service provider computer 110 can initiate the preparation of the one or more items that are to be delivered to the end user of the end user device 102 by a transporter of a transporter user device 114.

The one or more transporter user devices 114 can be devices operated by transporters. The one or more transporter user devices 114 can be smartphones, wearable devices, personal assistant devices, etc. A transporter can send an acceptance to fulfill an end user's fulfillment request. For example, the transporter user device 114 can generate and transmit an acceptance to fulfill a particular end user's fulfillment request to the central server computer 104. The central server computer 104 can notify the transporter user device 114 of the fulfillment request. The transporter user device 114 can respond to the central server computer 104 with an acceptance message to perform the delivery to the end user as indicated by the fulfillment request.

The navigation network 116 can provide navigational directions to the one or more transporter user devices 114. For example, the transporter user device 114 can obtain a location from the central server computer 104. The location can be a service provider parking location, a service provider location, an end user parking location, an end user location, etc. The navigation network 116 can provide navigational data to the location. For example, the navigation network 116 can be a global positioning system that provides location data to the transporter user device 114.

Figure 2:
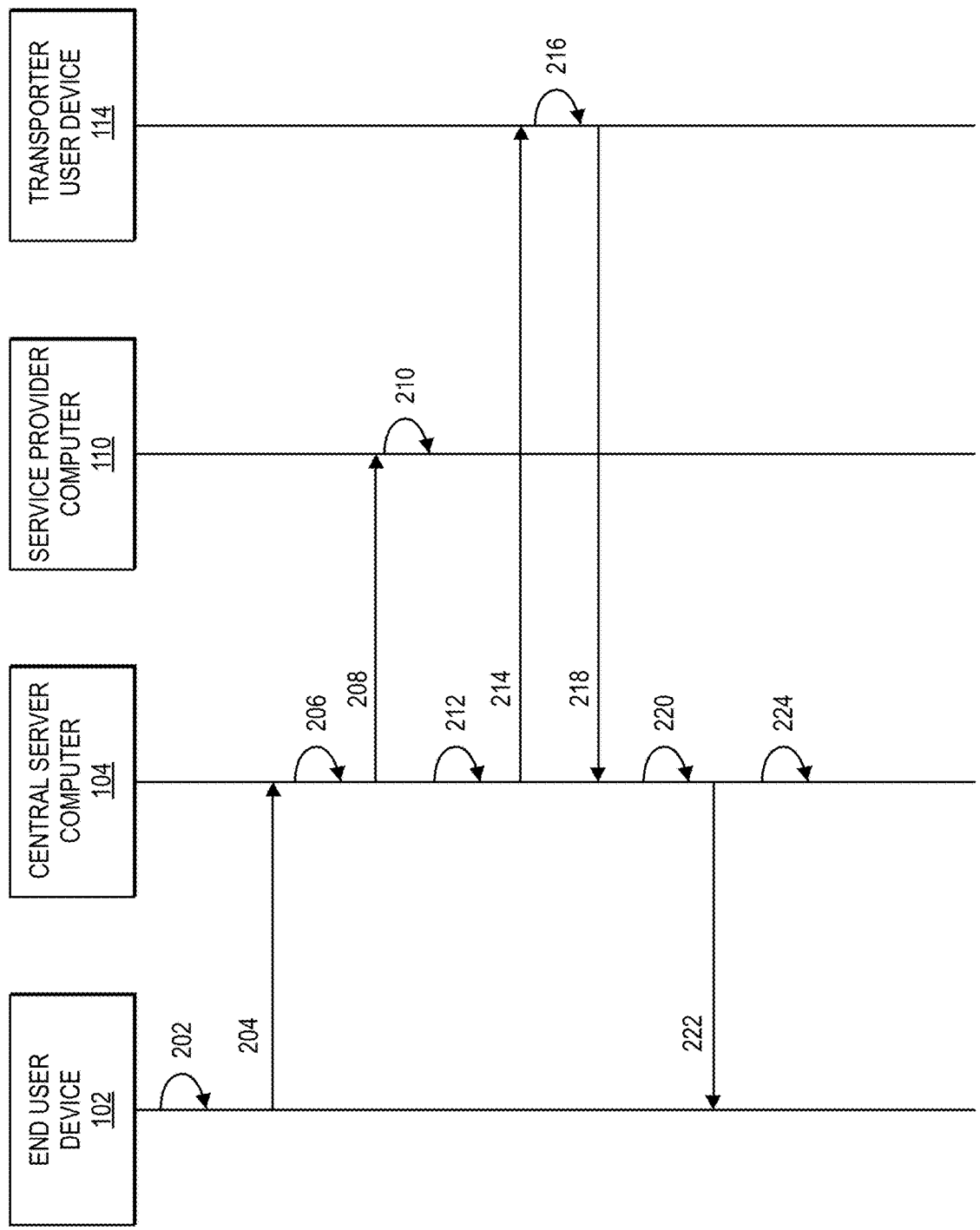
FIG. 2 shows a flow diagram illustrating a method for delivering one or more items provided by service providers to end users.

FIG. 2 shows a flow diagram illustrating a preparation and delivery method according to embodiments. The method illustrated in FIG. 2 will be described in the context of the central server computer 104 receiving a fulfillment request message from the end user device 102 to fulfill preparation and delivery of one or more items from a cart to the end user of the end user device 102. The central server computer 104 can communicate with the service provider computer 110 and the transporter user device 114 to fulfill the fulfillment request.

At step 202, the end user device 102 can decide to check out with a cart in a central server computer application installed on the end user device 102. The cart can include one or more items that are provided from a service provider of the service provider computer 110.

At step 204, after checking out with the cart, the end user device 102 can provide a fulfillment request message including the one or more items from the cart to the central server computer 104. The fulfillment request message can also include a service provider computer identifier that identifies the service provider computer 110.

At step 206, after receiving the fulfillment request message, the central server computer 104 can perform a transaction process with the end user device 102. For example, the central server computer 104 can communicate with a payment network to process the transaction for the one or more items. The central server computer 104 can receive an indication of whether or not the transaction is authorized. If the transaction is authorized, then the central server computer 104 can proceed with step 208.

At step 208, the central server computer 104 can provide the fulfillment request message, or a derivation thereof, to the service provider computer 110. The central server computer 104 can determine which service provider computer of a plurality of service provider computers to communicate with based on the service provider indicated in the fulfillment request message. For example, the fulfillment request message can indicate that the one or more items are provided by the service provider of the service provider computer 110. The central server computer 104 can identify the service provider computer 110 using the service provider computer identifier in the fulfillment request message.

At step 210, after receiving the fulfillment request message, the service provider computer 110 can initiate preparation of the one or more items. For example, the service provider computer 110 can alert a service provider associated with the service provider computer 110 of the fulfillment request message. The employees of the service providers can then prepare the one or more items for pick up by a transporter.

At step 212, after providing the fulfillment request message to the service provider computer 110, the central server computer 104 can determine one or more transporters operating one or more user devices that are capable of fulfilling the fulfillment request message. The central server computer 104 can determine the one or more transporters from the transporter user devices. The central server computer 104 can determine the one or more transporter user devices based on whether or not the transporter user device is online, whether or not the transporter user device is already fulfilling a different fulfillment request message, a location of the transporter user device, etc.

At step 214, after determining the one or more transporter user devices, the central server computer 104 can provide the fulfillment request message, or a derivation thereof, to the one or more transporter user devices including the transporter user device 114.

At step 216, after receiving the fulfillment request message, the transporter of the transporter user device 114 can determine whether or not they want to perform the fulfillment. The transporter can decide that they want to perform the delivery of the one or more items from the service provider location to the end user location. The transporter user device 114 can generate an acceptance message that indicates that the fulfillment request is accepted.

At step 218, after generating the acceptance message, the transporter user device 114 can provide the acceptance message to the central server computer 104.

After providing the acceptance message to the central server computer 104, the transporter user device 114 can communicate with the navigation network 116 and the transporter can proceed to the service provider location to obtain the one or more items. The transporter user device 114 can then receive input from the transporter that indicates that the transporter obtained the one or more items (e.g., the transporter selects that they picked up the items). The transporter user device 114 can then communicate with the navigation network 116 and the transporter can then proceed to the end user location to provide the one or more items to the end user. In some embodiments, the transporter user device 114 can provide update messages to the central server computer 104 that include a transporter user device 114 location and/or event data (e.g., items picked up, items delivered, etc.).

In some embodiments, after receiving the acceptance message, the central server computer 104 can notify the other transporter user devices that received the fulfillment request message that the fulfillment request is no longer available.

At step 220, at any point after receiving the acceptance message, the central server computer 104 can check the status of the fulfillment request. For example, the central server computer 104 can determine the location of the transporter user device 114 and can determine an estimated amount of time for the transporter user device 114 to arrive at the end user location.

At step 222, the central server computer 104 can provide an update message to the end user device 102 that includes data related to the fulfillment of the fulfillment request message. The data can include an estimated amount of time, the transporter user device location, event data (e.g., items picked up from the service provider), and/or other data related to the fulfillment of the fulfillment request message.

At step 224, the central server computer 104 can store any data received, sent, and/or processed during the fulfillment of the fulfillment request message into a database. For example, the central server computer 104 can store a user's cart selection as user features into a user feature database.

Figure 3:
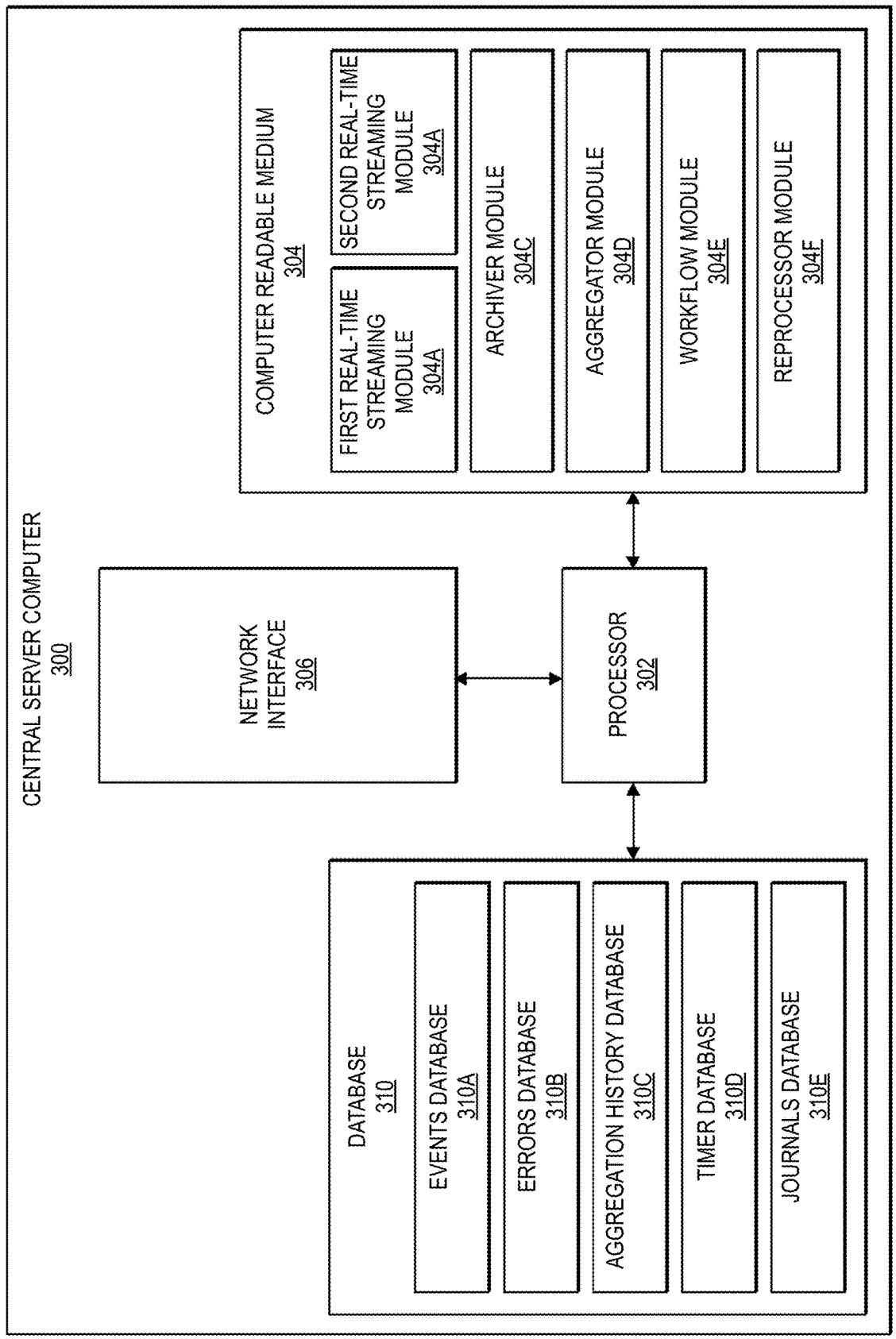
FIG. 3 shows a block diagram of a central server computer according to an embodiment.

FIG. 3 shows a block diagram of a central server computer according to an embodiment. The block diagram illustrates different parts of the central server computer 300 processing data in real time. The central server computer 300 may comprise a processor 303, which may be coupled to a non-transitory computer readable medium 304, a network interface 306, and databases 310.

The network interface 306 may include an interface that can allow the central server computer 300 to communicate with external computers. The network interface 306 may enable the central server computer 300 to communicate data to and from another device (e.g., a card, an item provider computer, etc.). Some examples of the network interface 306 may include a modem, a physical network interface (such as an Ethernet card or other Network Interface Card (NIC)), a virtual network interface, a communications port, a Personal Computer Memory Card International Association (PCM-CIA) slot and card, or the like. The wireless protocols enabled by the network interface 306 may include Wi-Fi™. Data transferred via the network interface 306 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 306 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The non-transitory computer readable medium 304 and can comprise several software modules including a first real-time event streaming module 304A, a second real-time event streaming module 304B, an archiver module 304C, an aggregator module 304D, a workflow module 304E, and a reprocessor module 304F.

The first real-time event streaming module 304A in conjunction with the processor 303 can process different real-time event data to form separate event data packets. The real-time event data can be associated with a plurality of transactions from a plurality of service provider computers, a plurality of end user devices, a plurality of transporter user devices, a logistics platform etc. Examples of real-time event data can include data related to: placing an order for an item, confirming the order for an item by a service provider, receiving acceptance from a transporter to deliver an item to an end user, picking up an item at a service provider by a transporter, etc. The first real-time event streaming module 304A may ingest, analyze, and/or transform event data into event data packets such that event data is scalable, fast, and durable.

The second real-time event streaming module 304B in conjunction with the processor 303 can streamline event data packets of a plurality of event data packet groups from the aggregator module 304D to a workflow module 304E.

The first and second real-time event streaming modules may be or may be based upon a software platform such as Apache Kafka, which is a distributed event store and stream-processing platform. It is an open-source system developed by the Apache Software Foundation written in Java and Scala.

The archiver module 304C in conjunction with the processor 303 can receive the event data packets from the first real-time event streaming module 304A. The archiver module 304C can store the event data packets in database 310 or a separate database in the cloud. The archiver module 304C and the processor 303 can store the event data packets for different use cases such as reprocessing or back testing. For example, the event data packets stored in the cloud database can be used as backup data.

The aggregator module 304D in conjunction with the processor 303 can filter and aggregate the event data packets received from the first real-time event streaming module 304A. The aggregator module 304D and the processor may filter out parts of event data packets that are irrelevant. For example, when the central server computer 300 processes event data packets for an accounting purpose such as corporate tax, personal information of each end user such as credit card numbers, names, email addresses, and the like can be filtered out. Upon filtering out the event data packets, the aggregator module 304D and the processor 303 can aggregate filtered event data packets by the one or more aggregator filters according to their corresponding transaction to form a plurality of event data packet groups. Examples one or more aggregator filters can be order event filter, delivery event filter, payment event filter, etc. Each event data packet group of the plurality of event data packet groups can comprise different event data packets corresponding to the same transaction. For example, a delivery event filter can aggregate event data packets with the same delivery ID (same transaction) to form a delivery event data packet group while a subscription aggregation filter can aggregate event data packets with the same subscription ID to form a subscription event data packet group. The aggregator module 304D and the processor 303 can provide the plurality of event data packet groups to the second real-time event streaming module 304B.

The workflow module 304E in conjunction with the processor 303 can validate event data in event data packets in an event data packet group and can process the event data packets in the event data packet group. In some embodiments, the workflow module 304E and the processor 303 can process event data in event data packets into journal entries suitable for accounting purposes, and can store the journal entries in a database. In some cases, the workflow module 304E can receive the plurality of event data packet groups from the second real-time event streaming module 304B. The workflow module 304E and the processor 303 can first validate event data in event data packets in an event data packet group by making sure that event data in the event data packets are consistent. For example, the workflow module 304E can check whether an amount for pay in (e.g., amount debited) events in the event data packet group equals to an amount for pay out (e.g., amount credited) events. In a specific example, event data associated with a "order submitted event" may include a total amount paid by an end user for a delivery of items produced by a service provider. The total amount should equal the amounts in a service provider payout event (associated with payment made to a service provider that provides the items in the order), an order commission event (associated with a fee obtained by the organization operating the central server computer 300), and a transporter payout event (associated with paying a transporter for transporting an item to the end user). If the event data packet group is validated, the central server computer 300 can store event data packets of the event data packet group in an events database 310A. If the event data packet group fails to be validated, the central server computer 300 can store the event data packets of the event data packet group in an errors database 310B and stop processing the event data packets.

The workflow module 304E can update the event data packets in the event data packet group by generating event data packets that are generated by the central server computer itself. These can be events data packets that are necessary for a flow of events in the event data packet group that are not received by outside parties (e.g., a plurality of service provider computers, a plurality of end user devices, a logistics platform, etc.). For example, an event data packet denoting taxes being added to the final amount credited can be generated by the central server computer. The event data packets generated by the central server computer can be added in the event data packet group. The updated event data packet group can then be validated.

The event data packets of the validated event data packet group can be aggregated and processed. For example, the event data packets can then be processed into journal entries according to different rules and regulations. The journals entries can be stored in a journals database 310E. The workflow module 304E can validate and process each event data packet group in the plurality of event data packet groups.

The reprocessor module 304F in conjunction with the processor 303 can perform similar functionalities as the aggregator module 304D. The reprocessor module 304F can be used when the event data packets have to be reprocessed to update different modules, fix potential errors in the modules, etc. The reprocessor module 304F can filter and update the event data packets saved in a cloud database by the archiver module 304C to determine a plurality of event data packet groups.

The database 310 may comprise several different databases including an events database 310A, errors database 310B, aggregation history database 310C, timer database 310D, and journals database 310E.

The events database 310A may comprise event data packets of the plurality of event data packet groups validated by the workflow module 304E. The errors database 310B can comprise event data packets of the plurality of event data packet groups that were not validated by the workflow module 304E. The aggregation history database 310C can store history of event data packets in the event data packet group. For example, the aggregation history database 310C can store a version of the event data packet group before adding event data packets generated by the central server computer, and store a version of event data packet group after adding event data packets. Whenever there are new event data packets added, a new version of the event data packet group can be stored in the aggregation history database 310C. The timer database 310D can be a database that stores time information of time-sensitive events. For example, if the event involves a subscription, then the timer database 310D may track times associated with the subscription for the event data packets related to the subscription. The journals database 310E can comprise journal entries. The journal entries may be determined by aggregating and processing different event data packets according to different rules and regulations.

Figure 4:
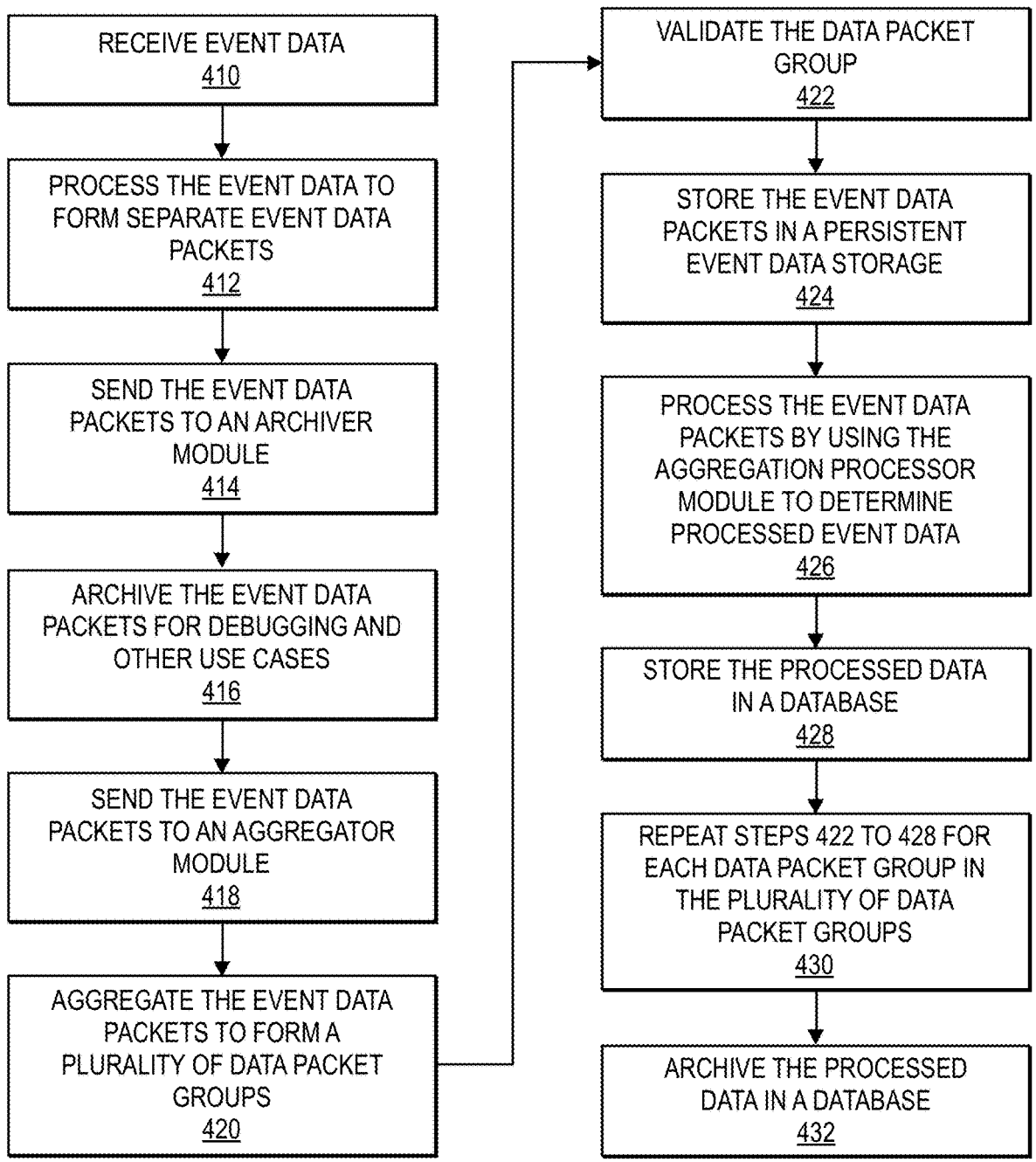
FIG. 4 shows a flowchart illustrating methods according to embodiments of the invention.

FIG. 4 shows a flowchart illustrating methods according to embodiments of the invention. Embodiments of the invention are not limited to the exact number of steps shown or the particular order shown. In the method, a central server computer such as the one shown in FIGS. 1 and 2 can be used. The central server computer can comprise a first real-time event streaming module, a second real-time event streaming module, archiver module, aggregator module, workflow module, reprocessor module, and an acceptance module to perform the embodiments of the invention. The aggregator module can comprise a personal identifiable information (PII) filter and one or more additional filters. The workflow module can comprise a validation module, a database that is a persistent event data storage, and one or more aggregator processors.

In step 410, the central server computer can receive real-time event data associated with a plurality of transactions from a plurality of service provider computers, a plurality of user devices, and a logistics platform. Event data can be associated with actions performed by entities providing the data to the central server computer. Examples of event data can include data associated with placing an order for an item, confirming the order for an item by a service provider, acceptance by a transporter to deliver one or more items to the end user, picking up one or more items at a service provider by the transporter, delivering one or more items by the transporter to the end user.

In step 412, the central server computer can process the event data to form separate event data packets using a first real-time event streaming module. The first real time streaming module can ingest, analyze, and/or transform event data into event data packets such that event data is scalable, fast, and durable.

In step 414, the central server computer can optionally send the event data packets to an archiver module. In step 416, the archiver module can store the event data packets in a database for different use cases such as reprocessing or back testing. In some embodiments, the event data packets can be stored in a third-party cloud database. For example, the events stored in the database can be used as a backup data in case the central server computer may need to reformat different modules such as aggregator module, workflow module, etc. The reprocessor module can filter and group the event data packets stored in the database to determine a plurality of event data packet groups similar to the aggregator module.

In step 418, the central server computer can provide the event data packets to the aggregator module.

In step 420, the personal identifiable information (PII) filter of the aggregator module can filter out the event data packets such that information irrelevant to processing are filtered. For example, if the central server computer is processing the event data associated with a plurality of transactions to determine accounting information such as total revenue, total tax amount, etc., then personal information such as a username, a payment credential, an email address, etc. can be filtered out and removed. The one or more aggregator filters of the aggregator module can aggregate the event data packets according to their corresponding transactions to form a plurality of event data packet groups. For example, a delivery data aggregation filter can aggregate event data packets with the same delivery ID (same transaction) to form a delivery event data packet group. A subscription aggregation filter can aggregate event data packets with the same subscription ID to form a subscription event data packet group.

The plurality of event data packet groups can then be provided to the second real-time event streaming module. The second real-time event streaming module can streamline the processing and transmission of data for the plurality of event data packet groups from the aggregator module to the workflow module.

In step 422, the event validator of the workflow module can validate an event data packet group of the plurality of event data packet groups by checking that the event data in the event data packets are consistent. For example, the workflow module can check whether an amount for pay in (e.g., amount debited) events in the event data packet group equals to an amount for pay out (e.g., amount credited) events. In a specific example, event data associated with a "order submitted event" may include a total amount paid by an end user for a delivery of items produced by a service provider. The total amount should equal the amounts in a service provider payout event (associated with payment made to a service provider that provides the items in the order), an order commission event (associated with a fee obtained by the organization operating the central server computer 300), and a transporter payout event (associated with paying a transporter for transporting an item to the end user).

In step 424, the central server computer can optionally store the event data packets of the validated event data packet group in a persistent event data storage. If the event data in the event data packet groups cannot be validated, then the central server computer can optionally store the event data packets in an error data storage (i.e., a database) for subsequent processing.

In step 426, the central server computer can process the event data in the event data packets in the event data packet group by using the aggregation processor module of the workflow module. In some embodiments, event data in the processed event data module can be processed in any suitable manner. In some embodiments, the event data can be processed so that they are journal entries suitable for accounting journals or ledgers. Different rules can be used to process the event data according to the desired end goal. For example, if the central server computer is processing the event data for an accounting purpose such as determining corporate tax, the event data can be parsed to select specific data that can be matched with specific accounting number to denote what the specific data means (e.g., 3801 can mean amount paid to a service provider, 4089 can mean subtotal, etc.).

In some embodiments, processing the event data in the event data packets in the event data packet group can involve other actions. If, for example, the event data packets events associated with computer activities in a computer network, the aggregated event data can indicate that the computers in the computer network are not functioning as expected. In such a case, alerts may be sent to users who can take action or automated controls (e.g., an automated shutdown or automated deployment of a software patch) related to the computer network may be invoked.

In step 428, the central server computer can store the processed data (e.g., journal entries) in a database.

In step 430, the central server computer can repeat steps 422 to 428 for each event data packet group in the plurality of event data packet groups. Note that the processing of other event data packet groups can be in parallel and need not be sequential.

In step 432, the central server computer can archive the processed data (e.g., journal entries) in a cloud database.

Figure 5:
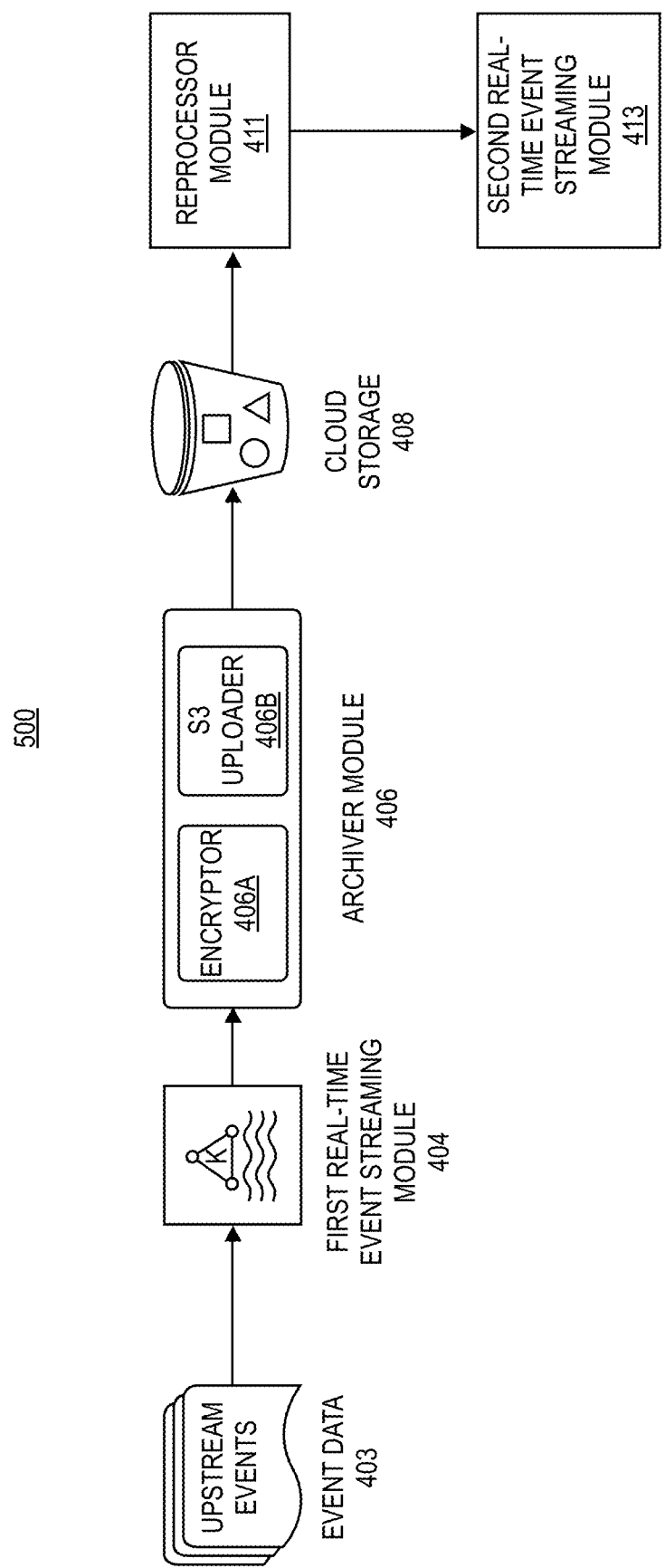
FIG. 5 shows a flowchart illustrating steps performed using an archiver module according to an embodiment.

FIG. 5 shows a flowchart illustrating the use of an archiver module 406 and a reprocessor module 411 in a central server computer according to an embodiment.

The central server computer can receive event data 403 associated with a plurality of transactions. The event data 403 can be real-time event data associated with a plurality of transactions from a plurality of service provider computers, a plurality of user devices, and a logistics platform. The event data 403 can be actions performed by entities providing the data to the central server computer. For example, the event data 403 can comprise placing an order for an item, confirming the order for an item by a service provider, assigning a transporter to the item, the transporter picking up an item, a transporter dropping an item, etc. A single order or transaction can have multiple event data.

The central server computer can receive the event data 403 using the first real-time event streaming module 404. The first real-time event streaming module 404 can process the event data 403 to form separate event data packets. The first real-time event streaming module can ingest, analyze, and/or transform event data 403 into event data packets such that event data packets are scalable, fast, and durable. The central server computer can provide the event data packets to the archiver module 406.

The archiver module 406 can comprise an encryptor module 406A and an uploader module 406B. Upon receiving the event data packets, the archiver module 406 can deserialize the event data packets into a format that can be stored in the cloud database. For example, if the event data packets are in a JSON file format, the encryptor module 406A may deserialize the JSON file into a .NET object file, as the cloud database cannot directly read the JSON file format. Upon deserializing the event data packets, the encryptor module 406A can be used to encrypt the deserialized event data packets. The encryption method to encrypt the deserialized event data packets can include but not limited to AES encryption, RSA encryption, ECC encryption, etc. The uploader module 406B can then upload the encrypted event data packets into the cloud storage 408.

The central server computer can store event data packets in the cloud storage 408 for different use cases such as reprocessing or back testing. For example, the events stored in the database can be used as a backup data in case the central server computer may need to reformat its software system including different modules such as an aggregator module or workflow module.

In such case where the data needs to be reprocessed, the reprocessor module 411 can download the event data packets from the cloud storage 408. The reprocessor module 411 can filter and group different event data packets into a plurality of event data groups. In some embodiments, the reprocessing module may decrypt the encrypted event data packets before filtering and grouping. The reprocessing module, similar to an aggregator module, can comprise a personally identifiable information (PII) filter and one or more aggregation filters. The reprocessor module 411 may use the PII filter to filter out information in the event data packets that are irrelevant for processing. For example, when processing the event data for accounting related purpose, personally identifiable information (PII) including the credit card number, name, email address, etc. can be filtered out from the event data packets.

The filtered event data packets can then be grouped together by the one or more filters according to corresponding transactions to form a plurality of event data packet groups as described above. The reprocessor module 411 can send the plurality of event data groups to the second real-time event streaming module 413.

Figure 6:
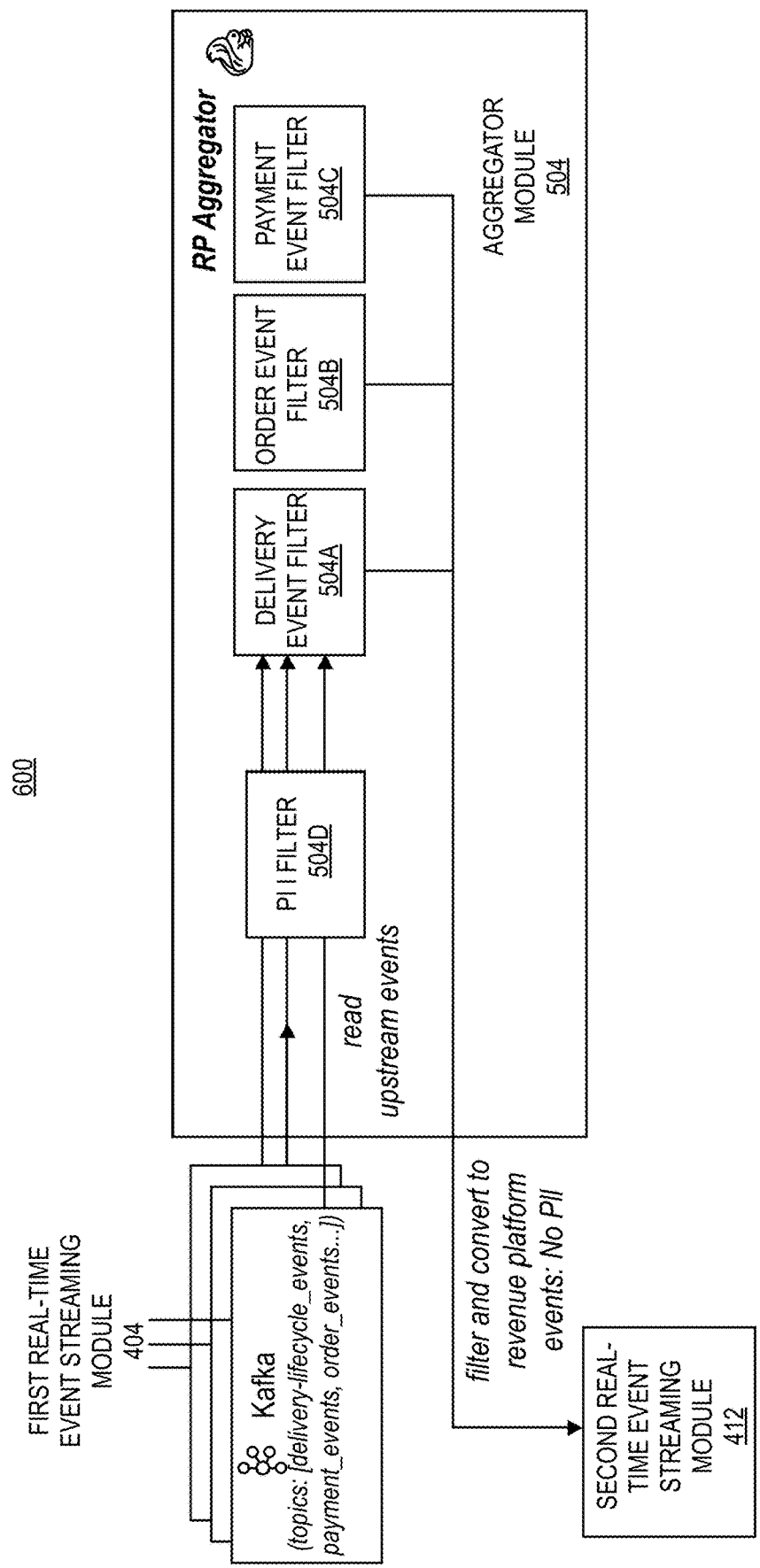
FIG. 6 shows a flowchart illustrating steps performed using an aggregator module according to an embodiment.

FIG. 6 shows a flowchart illustrating use of an aggregator module 504 according to an embodiment. The central server computer can use the aggregator module 504 to receive event data packets from a first real-time event streaming module 404. The aggregator module 504 can comprise a personally identifiable information filter 504D, and one or more aggregation filters including delivery event filter 504A, order event filter 504B, and payment event filter 504C. The aggregator module 504 can aggregate the event data packets by using the one or more aggregation filters according to their corresponding transactions to form a plurality of event data packet groups. The central server computer can provide the plurality of event data packet groups to a second real-time event streaming module 413.

Similar to FIG. 4, the central server computer can receive real time event data associated with a plurality of transaction from a plurality of service provider computers, a plurality of user devices, and a logistics platform. The central server computer can use the first real-time event streaming module to process the event data to form separate event data packets. The central server computer can provide the event data packets to the aggregator module 504.

Upon receiving the event data packets, the aggregator module 504 can deserialize the event data packets into a format that can be stored in a database. For example, if the event data packets are in a JSON file format, the aggregator module 504 may deserialize the JSON file into a .NET object file, as the cloud database cannot directly read the JSON file format.

The central server computer can use the PII filter 504D to filter out information in the event data packets that are irrelevant to processing. For example, when processing the event data for accounting related purpose, personally identifiable information (PII) including the credit card number, name, email address, etc. can be filtered out from the event data packets.

The central server computer can then use the one or more aggregation filters to aggregate the filtered event data packets according to their corresponding transactions to form a plurality of event data packet groups. Each event data packet group can comprise event data packets associated with the same transaction. For example, a delivery data aggregation filter can aggregate event data packets with the same delivery ID (same transaction) to form a delivery data packet group while a subscription aggregation filter can aggregate event data packets with the same subscription ID (same transaction) to form a subscription event data packet group. Each event data packet group can be associated with a different transaction. For example, one event data packet group can be associated with a delivery transaction while another event data packet group can be associated with a different delivery transaction. The central server computer can provide the plurality of event data packet groups to the second real-time event streaming module 413.

The one or more event filters can comprise, but not limited to, a delivery event filter 504A, order event filter 504B, and a payment event filter 504C. The delivery event filter 504A can aggregate event data packets with the same delivery order (e.g., by using the delivery ID). The order event filter 504B can aggregate event data packets with the same order (e.g., by using the order ID). The payment event filter can aggregate event data packets with the same transaction (e.g., subscription) by using the transaction ID.

The aggregator module 504 can wait until all the event data packets related to a transaction are received before aggregating the event data packets to form an event data packet group. The event data packets can be stored in a temporary data storage (e.g., RAM) while aggregating them as they come in). For example, for a delivery transaction, the aggregator module 504 can wait until the last delivery event (e.g., delivery dropped off) is received to complete the transaction. Upon receiving the last delivery event, the aggregator module 504 can aggregate event data packets associated with the delivery transaction to form an event data packet group. When the event data packet group is formed, the aggregator module 504 can send the event data packet group to the second real-time event streaming module 412.

Figure 7:
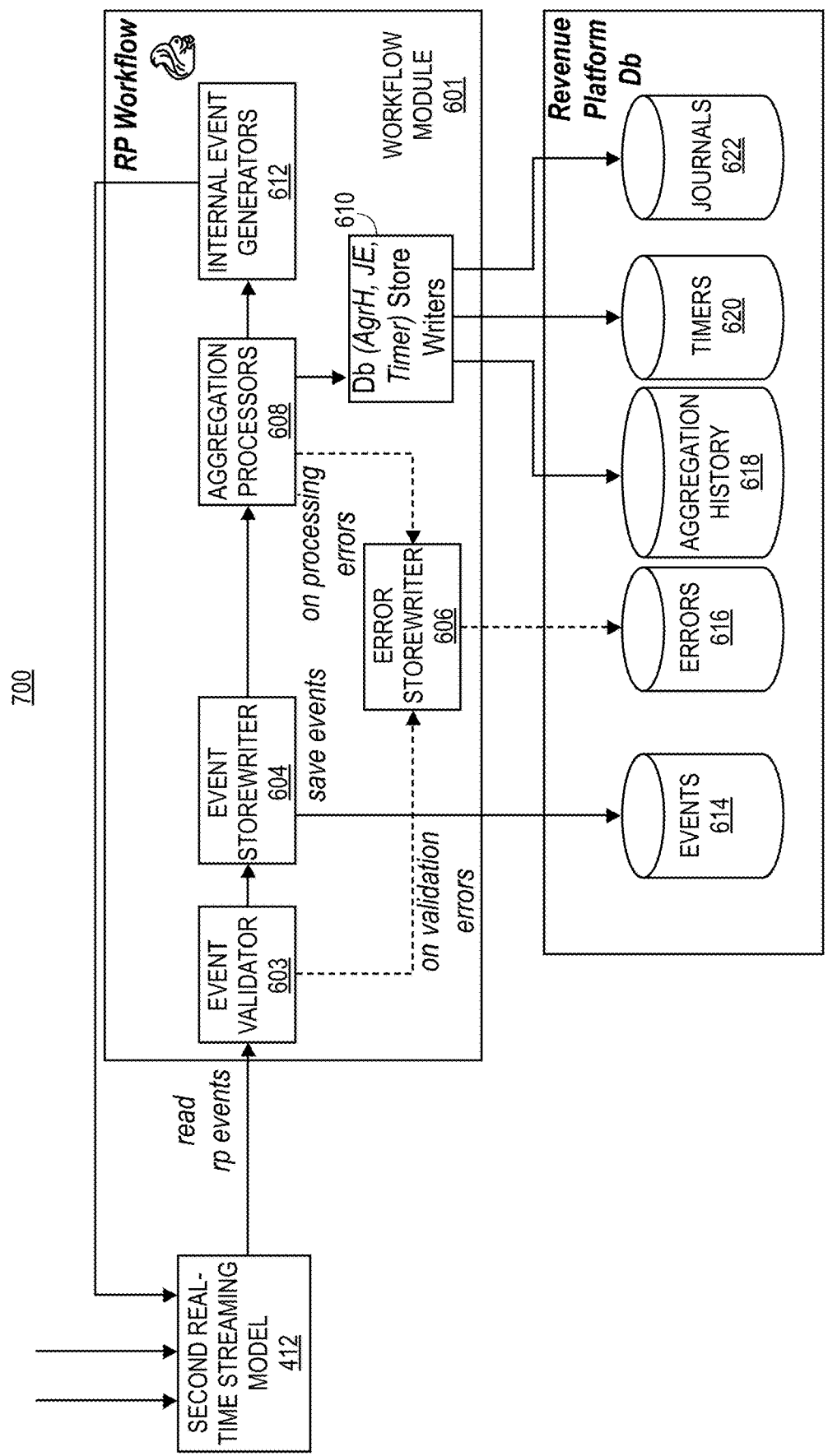
FIG. 7 shows a flowchart illustrating steps performed using a workflow module according to an embodiment.

FIG. 7 shows a flowchart illustrating the use of a workflow module according to an embodiment. The second real-time event streaming module 412 can provide a plurality of event data packet groups to workflow module 601. The workflow module 601 can validate, aggregate, and process each event data packet in each event data packet group of the plurality of event data packet groups. The workflow module 601 can comprise an event validator 603, writer module 604, error writer module 606, aggregation processor 608, database writer module 610, and internal event generator module 613. The workflow module 601 can comprise events database 614, errors database 616, aggregation history database 618, timer database 630, and a journals database 633.

The second real-time event streaming module 412 can provide an event data packet group of the plurality of event data packet groups to the event validator 603. The event validator 603 can validate the event data packet group by checking that the event data packets are consistent. For example, for a delivery order, the event validator 603 can check whether all the necessary events for the delivery order including order created, order picked up, order dropped off, etc. are in the event data packet group. It can also validate that the event data in the data packets in the event data packet group are consistent with each other as described above.

If the event data packets in the event data packet group are not validated by the event validator 603, the event data packet group can be sent to the error writer module 606. The error writer module 606 can store the failed event data packet group in the errors database 616. If the event data packets are validated, then the event data packet group can be sent to the writer module 604. The writer module 604 can store the event data packet group in the events database 614. The events database 614 can be a persistent memory or persistent data storage. The writer module 604 can additionally provide the successful event data packet group to the aggregation processor 608.

The aggregation processor 608 can then process the validated event data as described above. For example, in some embodiments, event data in the processed event data module can be processed in any suitable manner. In some embodiments, the event data can be processed so that they are journal entries suitable for accounting journals or ledgers. Different rules can be used to process the event data according to the desired end goal. For example, if the central server computer is processing the event data for an accounting purpose such as determining corporate tax, the event data can be parsed to select specific data that can be matched with specific accounting number to denote what the specific data means (e.g., 3801 can mean amount paid to a service provider, 4089 can mean subtotal, etc.).

The aggregation processor 608 can send the validated event data packet groups and processed data (e.g., journal entries) to a database writer module 610. In some embodiments, the aggregated event data packets may be associated with time-sensitive events. For example, one subscription event may relate to a paid one year subscription and can have a total amount for the subscription. Accounting rules may indicate that the subscription fee can only be realized as income to the organization operating the central server computer on a monthly basis. A timer could be created to create one event per month, such that those events are processed as journal entries realizing one twelve of the subscription fee every month. In such case, the timed event data entries can be stored in the timer database 630. The database writer module 610 can also store processed event data such as journal entries in the journal database 633.

The internal event generator module 613 can produce events. In some cases, event data packets are needed for a transaction, and those events may be internally generated rather than received from outside entities (e.g., a plurality of service provider computers, a plurality of end user devices, a logistics platform, etc.). For example, an event data packet denoting taxes being added to the final amount credited can be generated by the central server computer. These event data packets generated by the central server computer can be added to the existing event data packets of the event data packet group. The updated event data packet group can be validated by the event validator 603 and can be processed by the aggregation processor 608.

Different versions of event data packet groups can be stored in the aggregation history database 618. For example, the aggregation history database 618 can store a version of the event data packet group before adding event data packets generated by the internal event generator module 613, and store a version of event data packet group after adding event data packets. Whenever there are new event data packets added, a new version of the event data packet group can be stored in the aggregation history database 618.

FIG. 8A shows a sample event such as "order submit" in a JSON data format. As shown, a single event data packet can have event data including an event name (e.g., "order submit"), a subtotal amount, a currency type (e.g., "USD"), and a unit amount (e.g., "1649" or $16.49).

FIG. 8B shows an event data group data packet with event data from event data packets. The event data packets can be associated with the same delivery identifier in some embodiments (i.e., all events associated with a single delivery transaction). Each row can indicate a single event data packet. The data packet indicated by row 3 "Order_Submitted" can correspond to the data shown in FIG. 8A. As show, the data packet corresponding to row 3 can include event data such as an event ID, a name, an entity type, an entity ID and a publish time. Some elements such as the "unit_amount" and the "currency" can be shown in other columns (not shown in the table in FIG. 8B).

FIG. 8C shows a table with processed event data. In this specific example, the processed data corresponds to journal entries in an accounting journal. As an illustration of how the data in FIGS. 8A and 8B can be processed to result in the processed data shown in FIG. 8C, the data packet corresponding to row 4 named "Order_confirmation" can have a published time stamp of 1:32:18.1 on Dec. 13, 2022. The data in this data packet may also have a "unit_amount" of 2000 or $20.00 and a currency value of "USD" (not shown in FIG. 8B). This data can be processed to form the journal entries in rows 9 and 10 in FIG. 8C. The 2000 value, the currency "USD", and the time stamp of 1:32:18 on Dec. 13, 2022 are retrieved from the data packet and are associated with the accounting code 2201, is labeled "Merchant Payable" and 2000 is listed as a credit to the merchant or service provider. Also, the 2000 value, the currency "USD", and the time stamp of 1:32:18 on Dec. 13, 2022 are retrieved from the data packet and are associated with accounting code 4610, is labeled "Pass-through Payments: Subtotal" and 2000 is listed as a debit for another entity such as the organization that operates the central server computer.

The embodiments can have several advantages. One advantage is that embodiments enable event data to be cleansed, validated, and aggregated in real time in situations where event data is generated by different sources and groups of the events corresponding to those events are associated with individual transactions. As explained above, event data of different types can come from various sources at different times. Data associated with millions of events can be commingled in data streams, but embodiments of the invention can process this data so that it is useable in near real time. The central server computer does not have to wait for a period of time until the data is processed to understand the impact of data. Another advantage is that the data received is organized in an event based platform, where the data received is divided up in a granular manner which can allow better traceability and verification. Further, specific types of computations on the event data can be easily performed. For example, data such as total debits or total credits for different accounting type characterizations (e.g., "merchant payable") can be easily calculated, since the event data has been validated and pre-processed. Thus, embodiments of the invention significantly improve the speed and accuracy of data processing compared to conventional methods.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
receiving, by a central computer comprising a processor, a non-transitory computer readable medium comprising a real-time event streaming module, an aggregator module, and a workflow module comprising an event validator and one or more aggregation processors, and an events database, a plurality of event data packets associated with a plurality of transactions from a plurality of service provider computers, a plurality of user devices, and a logistics platform;
providing, by the real-time event streaming module to the aggregator module, the event data packets in real-time;
aggregating, by the aggregator module, the event data packets according to their corresponding transactions to form a plurality of event data packet groups; and
for each event data packet group in the plurality of event data packet groups:
validating, by the event validator, the event data in event data packets in the event data packet group by determining that a total of pay in amounts associated with the event data packets equals a total of pay out amounts associated with the event data packets,
after validating the event data in the event data packets in the event data packet group, storing the event data packets in the event data packets in the event data packet group in the events database, and
processing, by the one or more aggregation processors, the event data in the event data packets in the event data packet group, wherein processing the event data comprises matching specific data in the event data with one or more accounting numbers.

2. The method of claim 1, wherein processing the event data packets in the event data packet group further comprises creating one or more journal entries using the event data in the event data packets.

3. The method of claim 1, wherein the event data packets each comprise an event identifier.

4. The method of claim 1, wherein the event data packet groups are aggregated according to delivery identifiers.

5. The method of claim 1, wherein validating the event data further comprises determining that the event data in the event data packets are consistent.

6. The method of claim 1, wherein the aggregator module comprises one or more filters for filtering the event data packets.

7. The method of claim 6, wherein the one or more filters comprise a personal identifiable information (PII) filter.

8. The method of claim 6, wherein the one or more filters comprise a delivery event filter.

9. The method of claim 1, wherein the plurality of user devices includes end user devices and transporter user devices, the transporter user devices used by transporters that operate transporter vehicles.

10. The method of claim 1, wherein the transactions are delivery transactions.

11. A central server computer comprising:
a processor;
an events database; and
a non-transitory computer readable medium, the non-transitory computer readable medium comprising
a real-time event streaming module, an aggregator module, and a workflow module comprising an event validator and one or more aggregation processors,
wherein the real-time event streaming module comprises code for receiving a plurality of event data packets associated with a plurality of transactions from a plurality of service provider computers, a plurality of user devices, and a logistics platform, and
the aggregator module comprises code for receiving the event data packets in real-time from the real-time event streaming module and aggregating the event data packets according to corresponding transactions to form a plurality of event data packet groups, and
for each event data packet group in the plurality of event data packet groups:
validating, by the event validator, the event data in event data packets in the event data packet group by determining that a total of pay in amounts associated with the event data packets equals a total of pay out amounts associated with the event data packets,
after validating the event data in the event data packets in the event data packet group, storing the event data packets in the event data packets in the event data packet group in the events database, and
processing, by the one or more aggregation processors, the event data in the event data packets in the event data packet group, wherein processing the event data comprises matching specific data in the event data with one or more accounting numbers.

12. The central server computer of claim 11, wherein the real-time event streaming module is a first real-time event streaming module, and wherein the non-transitory computer readable medium further comprises a second real-time event streaming module, which preprocesses the event data packets after receiving the plurality of event data packets from the first real-time event streaming module.

13. The central server computer of claim 12, wherein the aggregator module comprises one or more filters for filtering the event data packets before the plurality of event data packets are received by the second real-time event streaming module.

14. The central server computer of claim 11, wherein the event data packet groups are aggregated according to event identifiers.

15. The central server computer of claim 11, wherein the events database is a persistent memory data storage.

16. The central server computer of claim 11, wherein the aggregator module aggregates the event data packets while the event data packets are stored in a temporary memory storage.

17. The central server computer of claim 11, wherein the plurality of user devices includes end user devices and transporter user devices, the transporter user devices used by transporters that operate transporter vehicles.

18. A system comprising:
a central server computer comprising
a processor,
an events database, and
a non-transitory computer readable medium, the non-transitory computer readable medium comprising
a real-time event streaming module, an aggregator module, and a workflow module comprising an event validator and one or more aggregation processors, wherein the real-time event streaming module comprises code for receiving a plurality of event data packets associated with a plurality of transactions from a plurality of service provider computers, a plurality of user devices, and a logistics platform, the aggregator module comprises code for receiving the event data packets in real-time from the real-time event streaming module and aggregating the event data packets according to corresponding transactions to form a plurality of event data packet groups, and for each event data packet group in the plurality of event data packet groups:

validating, by the event validator, the event data in event data packets in the event data packet group by determining that a total of pay in amounts associated with the event data packets equals a total of pay out amounts associated with the event data packets, after validating the event data in the event data packets in the event data packet group, storing the event data packets in the event data packets in the event data packet group in the events database, and processing, by the one or more aggregation processors, the event data in the event data packets in the event data packet group, wherein processing the event data comprises matching specific data in the event data with one or more accounting numbers;

and the logistics platform.

19. The system of claim 18, further comprising the plurality of user devices, wherein the plurality of user devices includes transporter end user devices.

20. The system of claim 18, wherein the logistics platform is configured to coordinate transporters as the transporters deliver items to end users.

* * * * *